UNITED STATES PATENT OFFICE.

FRANK M. DAVIS, OF BUTLER, PENNSYLVANIA.

MILK EXTRACT OF WILD SPIKENARD.

976,051.  Specification of Letters Patent.  Patented Nov. 15, 1910.

No Drawing.  Application filed June 8, 1909.  Serial No. 500,977.

*To all whom it may concern:*

Be it known that I, FRANK M. DAVIS, a citizen of the United States, residing at Butler, in the county of Butler and State of Pennsylvania, have invented certain new and useful Improvements in Milk Extract of Wild Spikenard; and I do declare the following to be a full, clear, and exact description of the invention, such as will enable others skilled in the art to which it appertains to make and use the same.

My invention has for its object to produce a milk extract of wild spikenard (*Vagnera racemosa* (L.) *moroul*), which is designed for use as a remedy for hemorrhoids or bleeding piles.

In making the extract I take approximately four ounces of the root to which I add approximately one quart or thirty three ounces of milk, and gradually bring the mixture to the boiling point, in an open vessel, and maintain it at the boiling point until the volume of the milk is reduced, approximately, one third in quantity or measure, and then the extract is allowed to gradually cool. The resultant product is an extract formed of soluble constituents of the root which have combined with constituents of the milk, for which they have an affinity.

This milk extract of spikenard, I have discovered to be especially efficacious in allaying the inflammation, reducing the dilatation, and healing the veins of the lower part of the rectum incident to piles or hemorrhoids, and in a comparatively short time giving very pronounced relief. The extract is taken internally, and in doses of approximately eleven ounces of the fluid extract at each administration, at intervals of twelve hours apart.

Having described my invention and set forth its merits, what I claim is:—

The within described milk extract of wild spikenard.

In testimony whereof I affix my signature in presence of two witnesses.

FRANK M. DAVIS.

Witnesses:
 PETER CURRY,
 ARTHUR PRYER.